(12) United States Patent
Gupta

(10) Patent No.: US 9,081,779 B2
(45) Date of Patent: Jul. 14, 2015

(54) CENTRAL STORAGE REPOSITORY AND METHODS FOR MANAGING TAGS STORED THEREIN AND INFORMATION ASSOCIATED THEREWITH

(75) Inventor: Puneet K. Gupta, Newark, CA (US)

(73) Assignee: Connectbeam, Inc., Newark, CA (US)

( * ) Notice: Subject to any disclaimer, the term of this patent is extended or adjusted under 35 U.S.C. 154(b) by 0 days.

(21) Appl. No.: 12/132,370

(22) Filed: Jun. 3, 2008

(65) Prior Publication Data
US 2009/0043789 A1    Feb. 12, 2009

Related U.S. Application Data

(63) Continuation-in-part of application No. 11/835,658, filed on Aug. 8, 2007.

(51) Int. Cl.
G06F 17/30    (2006.01)

(52) U.S. Cl.
CPC .... G06F 17/30029 (2013.01); G06F 17/30038 (2013.01); G06F 17/30884 (2013.01); G06F 17/30997 (2013.01)

(58) Field of Classification Search
CPC .............. G06F 17/30038; G06F 17/30864; G06F 17/30997; G06F 17/30884; G06F 17/30029

USPC ...................... 707/736, 999.1, 100
See application file for complete search history.

(56) References Cited

U.S. PATENT DOCUMENTS

| | | | |
|---|---|---|---|
| 2004/0221041 A1* | 11/2004 | Tabbara | 709/227 |
| 2006/0235894 A1* | 10/2006 | Rasmussen et al. | 707/200 |
| 2007/0124208 A1* | 5/2007 | Schachter et al. | 705/14 |
| 2008/0034279 A1* | 2/2008 | Kumar et al. | 715/206 |
| 2008/0168055 A1* | 7/2008 | Rinearson et al. | 707/5 |
| 2009/0089301 A1* | 4/2009 | Kalantri | 707/100 |
| 2009/0144240 A1* | 6/2009 | Singh et al. | 707/3 |
| 2009/0150342 A1* | 6/2009 | Muller et al. | 707/3 |
| 2009/0164267 A1* | 6/2009 | Banatwala et al. | 705/7 |

* cited by examiner

*Primary Examiner* — Jensen Hu
(74) *Attorney, Agent, or Firm* — Donald R. Boys; Central Coast Patent Agency, Inc.

(57) ABSTRACT

An information system includes at least one data storage device accessible through a network for storing tags and tag attribute data, a server connected to the network and to the at least one data storage device for serving tags and tag attribute data and for receiving tags and tag attribute data, and one or more processors connected to the server and to the at least one data storage device, the processor or processors running sets of instructions for managing the tags and tag attribute data.

1 Claim, 8 Drawing Sheets

CENTRAL STORAGE REPOSITORY AND METHODS FOR MANAGING TAGS STORED THEREIN AND INFORMATION ASSOCIATED THEREWITH

CROSS-REFERENCE TO RELATED APPLICATIONS

The present invention is a continuation in part (CIP) to a U.S. patent application Ser. No. 11/835,658, filed on Aug. 8, 2007, entitled FOLKSONOMY-ENHANCED ENTERPRISE-CENTRIC COLLABORATION AND KNOWLEDGE MANAGEMENT SYSTEM, incorporated in its entirety at least by reference.

BACKGROUND OF THE INVENTION

1. Field of the Invention

The present invention is in the field of network-based communications and information discovery and pertains particularly to network-based storage and management of tags and information associated therewith.

2. Discussion of the State of the Art

With the advent of networking, companies and organizations have depended on software-based communications and research tools to manage enterprise activities and to attempt to improve workforce performance; streamline workflow; and improve quality of service. Many modern network-supported communication and collaboration tools include Email Applications, Instant Messaging Applications, File Sharing Applications, Network Collaboration Software, Time Management Applications, Central Directory Applications, Network Telephony Applications and a wide array of others. Many of these tools are often packaged together as Customer Relations Management (CRM), Internal Relations Management (IRM), and Business-to-Business (B2B) Enterprise Solutions. These solutions are meant to improve performance of the enterprise as a whole.

In an enterprise, it is critical that internal data required to enable task performance is easy to find, and once found, immediately accessible to those who need it. Several challenges exist for a large enterprise related to human task performance, internal interaction and data retention, and database management as it relates to workflow within the enterprise. In many large enterprises, a class of workers known as knowledge workers is typically responsible for much of the data management and how that data may be accessed and used, as well as how data is stored and maintained within the enterprise data stores. It is important that critical data has integrity, is reliable, and can be swiftly accessed and improved upon by updating and adding new relevant data.

In many enterprises workers who must generate workflow spend inordinate amounts of time trying to locate relevant information within the enterprise that may be critical to their tasks. In many cases they must order data from an authorized knowledge worker and must wait until the knowledge worker can accommodate the request. More particularly, there is typically no smooth, incoming flow of task relevant data to the worker. If the worker has an internal search tool, often much irrelevant data is included in a search result with a small portion of relevant information that the worker must drill down to.

Another problem that exists with larger enterprises is that knowledge of human resources, employee skills, ongoing projects, product data, service data, customer data, and so on is not typically available across the divisions of the enterprise compartments. For example, a worker in sales management may not be familiar with the personnel and expertise of those personnel working in the manufacturing arm of the same enterprise. Much input may be required of the worker to search out and disseminate this type of data if authorized to receive it.

There are existing applications that attempt to centrally locate employee information, database resources, and other such information so that an employee, by logging into a system using a desktop application may access information and other resources during the performance of workflow. A problem with this approach is that it is standardized in format, rigid in protocol, and often-complex procedures (almost rituals) are required to actually gain access to relevant information. Often the data, once accessed, is old and out of date, no longer relevant, or otherwise not validated as useful or the right data to incorporate into the workflow. Data aggregation and updating of the system databases with relevant data does not occur while the workflow progresses but often at some later time, meaning that the most recent data is not always available.

Often as well relevant data needs to be associated with, or provided in a way to complement other relevant data. Sometimes more abstract data is required in order to enable the worker to understand the data he or she has accessed. A supervisor or a more knowledgeable worker may not be immediately available to the worker to help tie the meaning of the data sets together. Enterprise personnel are constantly struggling with these types of frustrations under existing information-access and data management systems.

The inventors are aware of a network-based system, though not in the public domain, for enhancing cooperation among persons engaged in an enterprise. This system utilizes a server coupled to the network, the server executing software providing one or more interactive displays on computerized appliances operated by the persons. The system includes a data repository accessible to the server. The system maintains enterprise-related profiles for individual ones of the persons in the data repository, including resources, and also tracks, manages and records enterprise-related activity of the persons, including data associated with such activity. The system also enables individual ones of the persons, through the interactive displays provided, to discover and utilize data and/or resources associated by the system with others of the persons.

One way enterprise resources and personnel are rendered discoverable in this system is by association of people and resources including works, projects and contact messages through tagging. As a user works under the system, he or she may bookmark resources and data including documents and apply tags to those data. Thereafter, that user may be found associated to those resources and tags enabling a kind of knowledge base that extends outside of the enterprise domain to include other activities, interests and knowledge of persons where the persons have elected to make such knowledge available to the enterprise.

It has occurred to the inventor that tags are the most versatile utilities for indexing, correlating and associating any computerized data regardless of where that data resides on a network. As a user bookmarks resources and tags those resources for latter search purposes, tag history and tag attribute data for that user can be leveraged to provide rich information about the user and what the user is working on or involved in. By correlating tag attributes of multiple persons, commonalities begin to develop among those persons. Though correlation then, knowledge may be gained by any one user by searching for information using keyword or phrase input initially to begin the search, the input being matched to one or more tags having attributes that can be leveraged to further information discovery over multiple optional paths.

It would be desirous to be able to expand the enterprise bank of knowledge and searchable content well beyond the physical boundaries of the enterprise to include content and resources tagged and recorded in domains largely external to the enterprise. It would also be desirous to make information discovery and collaboration opportunities available on a broad scale through existing collaboration and communication applications and information search services.

Therefore, what is clearly needed is a tag repository and information management system that tracks and manages all of the tags created and leveraged by users operating on a network irrespective of network boundaries.

SUMMARY OF THE INVENTION

A problem stated above is that information search systems and services lack flexibility relative to information retrieval and discovery. Every searchable piece of data accessible through a data network is tied to one or more keywords that must be matched to in order to find the data and return the data result for potential navigation. However, search keywords are limited in the information they can provide to the location of the information and in some cases locations to similar or related information. When conducting an information search it is desirable that content located has understandable relevancy in light of the goals of the search process and that other avenues of information discovery are readily available to the practicing user. Conventional search tools do not provide any collaborative opportunity or alternate jump-off points to different research paths that may branch from the original path initiated.

The inventor searched components and systems related to information search and discovery looking for components and methods that could potentially be leveraged to provide a richer and more efficient experience for users practicing information search, discovery, and access. Every data set indexed for information search has a history. However, the history surrounding the information and how it became available over the network is largely ignored.

In an inventive moment, the inventors conceived and subsequently architected an information search and discovery system that provided users with the ability to discover rich information including history of content creation and access. The system also enabled interactive opportunities to further information discovery through real-time interaction with the information about the content leading to alternate paths for furthering the information discovery process and novel methods for categorizing the content and fine tuning access parameters to maximize relevancy between information discovery methods and the content type.

Accordingly, an information system is provided comprising at least one data storage device accessible through a network for storing tags and tag attribute data, a server connected to the network and to the at least one data storage device for serving tags and tag attribute data and for receiving tags and tag attribute data, and one or more processors connected to the server and to the at least one data storage device, the processor or processors running sets of instructions for managing the tags and tag attribute data. The tag attribute data may include but is not limited to information about creators and users of the tag, a ranking value measuring tag relevancy, and location information to one or more sets of data to which the tag was applied.

In one embodiment the at least one data storage device, the server, and the one or more processors are housed in a single appliance configurable to run on the network, which may be an Intranet network connected to an Internet network. The instruction sets may include instructions for ranking tags according to usage statistics, for aggregating tags including those relative to a user, those relative to a resource, and those relative to more than one user.

In a preferred embodiment, the tag attribute data is made visible with a tag when the tag is electronically invoked. The tag attribute data, in one aspect, is contained in an interactive window as a tag information summary of which components thereof are executable to further information retrieval.

The system further includes, in one aspect, a connector framework for providing component integration to at least one other information system, which may be a data search service system and or a social networking service. The system further includes one or more user-configurable filters for narrowing the scope of information retrieved relative to tag attribute data. In one embodiment the system further includes an information correlation engine for assembling different list views of tag attribute data according to request or filter applied.

According to another embodiment of the invention, a method is provided for classifying a tag stored in a tag repository including the steps (a) determining location information of a data resource or of data resources the tag points to, (b) determining identification information of a user or users whom created the tag, (c) determining usage data of the tag relative to use in information discovery, (d) determining time statistics relative to tag creation and usage, and (e) attributing the information determined in steps (a) through (d) to the tag in a fashion rendering the information accessible by electronic invocation of the tag.

In one aspect of the method location information is one or more of a universal resource locator (URL), a universal resource indicator (URI), a machine address code (MAC), a data storage address, a file location on a computing appliance or a contact parameter. In one aspect, identification information of step (b) includes user name and user contact parameters. Also in one aspect, usage data in step (c) includes number of times the tag was used in an information search and the identities of users who used the tag. In one aspect of the method electronic invocation of the tag is accomplished through a computer input device and the tag attribute information is presented in an interactive window associated with the tag, the attribute information made interactive.

BRIEF DESCRIPTION OF THE DRAWING FIGURES

DETAILED DESCRIPTION

The inventors provide an information discovery system driven by a tag repository whereby users may discover resources and information about other users by using interactive tags and associated metadata. The system and methods for using the system are described in enabling detail in various embodiments.

Figure 1:
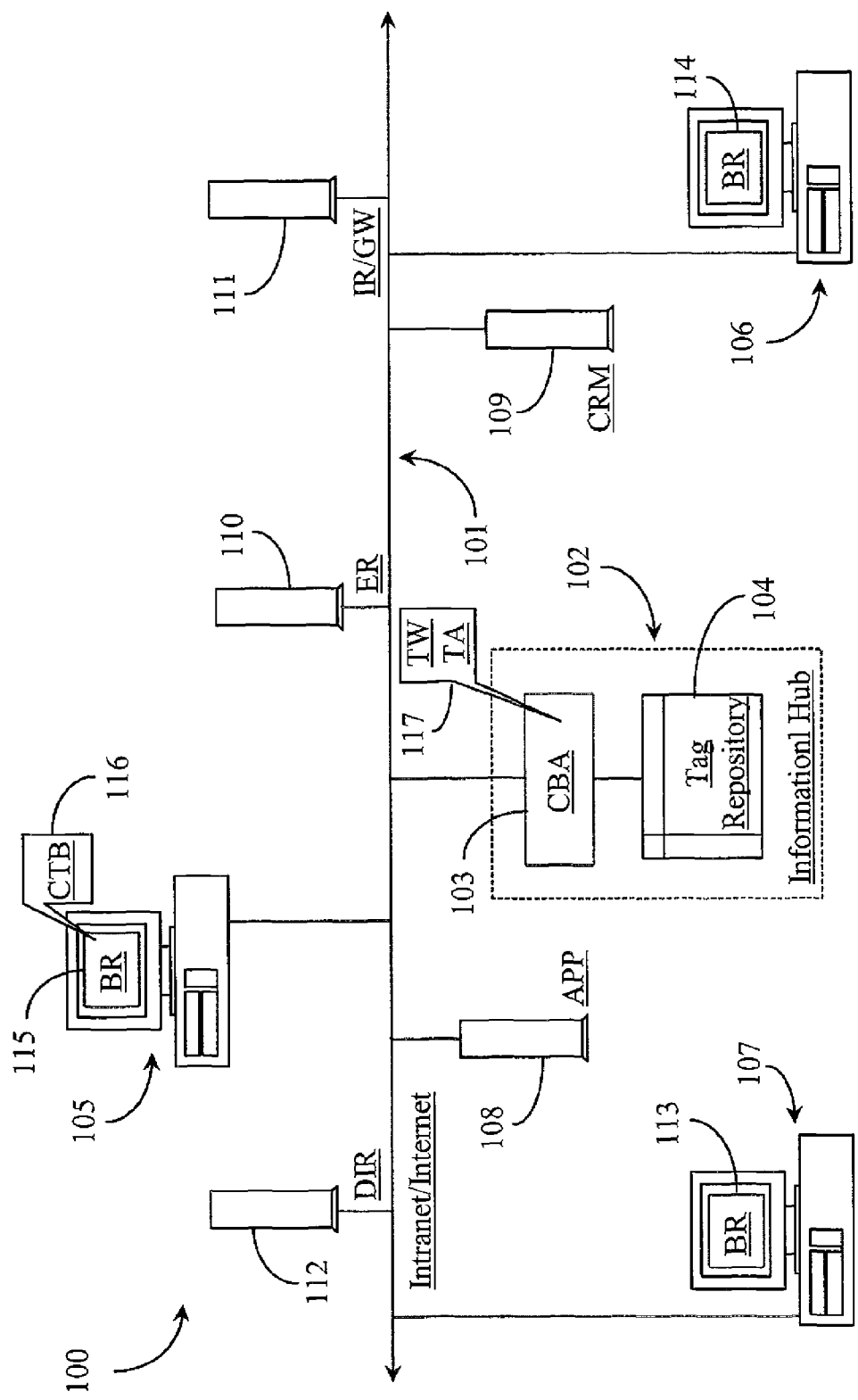
FIG. 1 is an architectural overview of a data communications network supporting information discovery according to an embodiment of the present invention.

FIG. 1 is an architectural overview of a data communications network 100 supporting information discovery according to an embodiment of the present invention. Data communications network 100 may be an enterprise specific data network such as a corporate wide-area-network (WAN), a municipal-area-network (MAN), a campus-area-network (CAN) an Intranet, or an Internet network. In the case of a network limited by domain, support for and connection access to the Internet network is assumed although not required in order to practice the invention. Data network 100 is further characterized by a logical network backbone 101 that represents all of the lines, equipment and access points that make up the network as a whole.

In one aspect of the invention, network 100 is an enterprise 2.0 Intranet network servicing a specific group of users related by profession or association such as enterprise personnel for example. However, one with skill in the art of networking will appreciate that the system of the invention can be practiced over multiple interconnected networks as well as over public wide-area-networks like the Internet network.

In this example, the system of the present invention is provided as a functional information discovery hub 102 shown connected to backbone 101 of the network. Information hub 102 may be provided in the form of a computerized appliance termed by the inventor a Connect-Beam appliance (CBA) 103. CBA 103 includes server capability over the network and data processing, including software for processing and managing data for access by users of the system.

CBA 103 is coupled with a data repository illustrated herein as a central tag repository 104. Tag repository 104 may be an internal storage device to CBA 103 without departing from the spirit and scope of the present invention. In one embodiment, tag repository 104 is a system of one or more external data storage devices or systems accessible by high speed data network to CBA 104. Tag repository 104 is adapted to store tags and associated tag attribute data or metadata for access and use by users. Access in this case is through CBA 103 over network backbone 101.

In one embodiment of the present invention, hub 102 is integrated with an enterprise 2.0 Web portal accessible to those authorized by an enterprise to use the system. In other embodiments, hub 102 may be partly or fully accessible to public individuals for the purpose of extending the user base of the system. In another embodiment, information hub 102 may be a part of a third party service to one or more subscribing enterprises or defined groups. In this case, the system may be entirely Web-based whereby users have access to the system through a service portal, for example.

In any of the above embodiments, CBA 103 is adapted to manage tags and associated information. CBA therefore includes at least a tag weighting (TW) and tag aggregation (TA) application (SW) 117. SW 117 may also include information management SW including information correlation and server software for connecting to other machines on the network for the purpose of sending and receiving data upon request.

In this embodiment, network 100 includes an Internet router (IR) or gateway (GW) 111 connected to backbone 101. IR/GW 111 is adapted to provide access to the Internet network for persons and systems connected to network 100 and to provide access to information hub 102 to authorized persons connecting to the system via the Internet. In this aspect, one does not have to be connected directly to network backbone 101 in order to practice the invention.

Intranet backbone 101 supports a directory server (DIR) 112. DIR 112 may be a lightweight directory access protocol (LDAP) server adapted to provide directory information for enterprise personnel and enterprise defined groups and service departments. Domain name servers (DNS) and other directory servers generic to the Internet network may also be represented in this example though not specifically illustrated.

Intranet backbone 101 supports an enterprise application server (APP) 108. APP 108 is adapted to store and serve enterprise applications defined as applications that help the enterprise achieve its goals. A sales force application (SFA) provides an example of one type of application that may be maintained in and made accessible from server 108.

Backbone 101 supports an email routing server (ER) 110, and a customer relations management (CRM) server 109. Other types of equipment may be included within the scope of this example without departing from the scope of the invention. The inventors illustrate one or more system or servers that are typical of enterprise networks to illustrate options for system integration.

Network 101 supports a plurality of personal computers (PCs) connected to backbone 101. Illustrated in this example are a PC 105, a PC 106, and a PC 107. Each PC 105-107 ha an instance of browser SW (BR) for network navigation as is generally known in the art. PC 105 includes BR instance 115. PCs 106 and 107 host BRs 114 and 113 respectively. The inventor provides a vehicle for streamlining access to the information system (102) to users in the form of a tool bar termed a "Connect Beam toolbar" (CTB) 116 running in the browser on PC 106. CBT 116 may be downloaded by users and installed as a plug-in to their browser applications or other browser-based or supported communications applications. Instances of CBT 116 are not illustrated with respect to browser 113 of PC 107 or on browser 114 on PC 106 but may be assumed available and present on those systems.

A user operating at any one of PCs (105; 106; or 107) may highlight any content that is displayed within their browser window or within any other application that may be supported by the system and may tag that content. The tag applied may be one suggested by the system of the invention or a tag that the user personally introduces and submits to the system for storage. When a user tags a resource or piece of information they may invoke CBT 116 during the process and CBT 116 opens a connection for the user to CBA 103. The system recognizes the accessing user and receives the information generated during the process of the user tagging the resource or piece of information. A resource may be identified by title, name, URL, URL/URI, machine address, or some other attribute like a contact parameter. People may be considered a resource of the network and may be tagged by users or even by themselves. The content is "bookmarked" in the tagging process and can be relocated by using the tag to find the content.

Other types of information that might be tagged include photos, messages, recordings, video segments, documents, notes, calendar appointments, reservations, e-books, sales ads, and so on. Virtually any information that can be displayed on a graphics display screen can be tagged using the system of the present invention. As a user interacts on the network, the user may tag content many times using any tag term desired. Content that is tagged by a user may also be content that is tagged by other users.

A tag might be alphabetic, alphanumeric, numeric, or may consist of letters and symbols like an email domain for example. However, for the purpose of simplicity a tag may be considered to be any descriptive word used to associate to a set of data from the perspective of latter finding the data using the tag in an information search to locate it.

Tagged information may exist anywhere on network 100 and beyond the network such as on the Internet network. DIR 112, APP 108, CRM 108, ER 110, and PCs 105-107 may contain information that has been tagged by one or more users where the tags used have been sent to and stored in tag repository 104 for latter reference. Metadata may be associated with each tag as tag attributes and the tags including the metadata are managed centrally in information hub 102. Actual content tagged may reside anywhere on network 100 or beyond network 100 such as on the Internet or on a connected sub-network.

To practice the present invention from a user standpoint, the inventor may provide certain client applications and tools to enable users to practice the invention from remote or local network appliances. In this example, users are operating PCs 105-107. However, that should not be construed as a limitation of the present invention. Any computerized appliance capable of accessing the network may be used to practice the invention, which is essentially tagging content and retrieving information based on tags used to search for the content. Access to information system 102 may be provided to Laptops, personal digital assistants (PDAs), third or fourth generation (3G, 4G) cellular telephones, and other hand-held appliances capable of browser navigation of networks.

The system may be integrated with enterprise applications like a sales force application (SFA), for example and general communications and messaging applications like desktop email applications. Application extensions or application program interfaces (APIs) may be integrated into framework of the system for supporting outside third-party applications, internal enterprise applications, and third-party information search engines. More detail about application integration for the purpose of enabling the process of the invention relative to specific applications will be provided later in this specification. In one unique aspect of the present invention, tags maintained in the tag repository are rendered interactive and executable for the purpose of enabling tag invocation to further information discovery.

Figure 2:
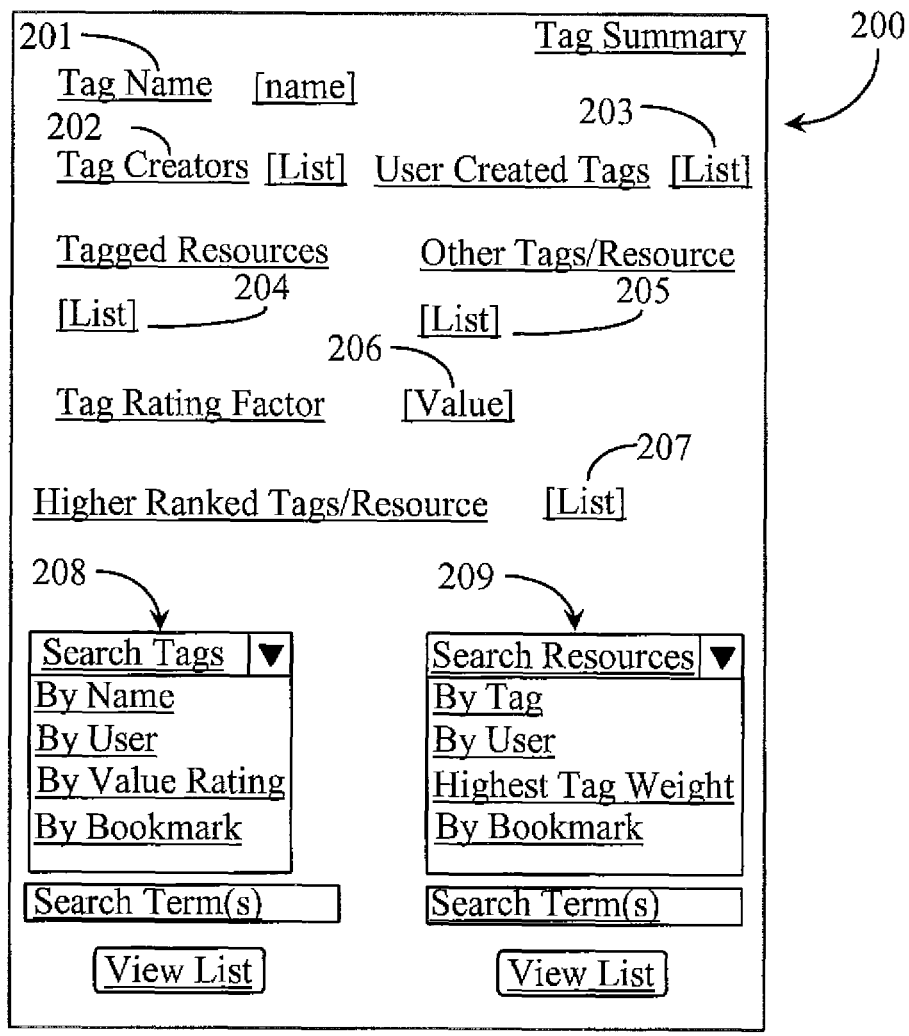
FIG. 2 is a generalized view of an interactive tag-summary window according to an embodiment of the invention.

FIG. 2 is a generalized view of an interactive tag-summary window 200 according to an embodiment of the invention. Interactive window 200 is referred to in this specification as a tag summary. A tag summary is a visual presentation of metadata (tag attributes) associated with any tag managed by the system of the present invention. Tag summary 200 may be invoked by selecting or highlighting a tag managed by the system of the invention and interacting with the tag via a computer input action such as a mouse click or mouse over, for example.

Tag summary 200 provides rich information about the tag and tag history. Tag summary window 200 may be interactive in the sense that data contained within the window may be rendered interactive by hyperlink to provide browser-style navigation within the window to further access and research additional information associated with the tag. The information available within window 200 may be considered attributes of the tag that can be navigated to discover additional information and to open opportunities for collaboration between users.

Tag summary 200 may display as a separate navigable window outside of the main browser window, or it may be configured to run inside the browser frame nested in the frame. A tag summary like summary 200 may be accessed wherever a tag managed by the system is represented electronically such as in a document, on a Web page, in an email message or directly from storage. The electronic representation of a tag managed by the system includes a server link to the system so that tag summary 200 can be served over the connection.

Tag summary window 200 has a tag name associating the information with the correct tag. Tag summary 200 contains a link "Tag Creators" 202 that when invoked through interactive method will display a list of users who have created and submitted this tag and have tagged content with it. Tag creation is defined as the introduction of a tag for tagging content where that content was not already known and associated in the system with that particular tag. This is from the perspective of a user. Therefore, there may be a list of multiple creators for a same tag managed in the central tag repository (104) described with respect to FIG. 1. If a tag not previously known to the system is submitted for the first time then the tag has one original creator.

List 202 may be expanded from within window 200 to show all of the users by names that are associated with the tag. A user interacting with the tag summary may select a user from the expanded list and may invoke through interactive input a list 203 of other tags created by that user. List 203 does not appear in the initial display of tag summary 200 but can be accessed through interaction within the window, specifically through interaction with the tag creators list.

Tag summary 200 may initially display upon invocation a list 204 of tagged resources or content that the tag applies to. A single tag may point to multiple resources or content. Therefore, double clicking the hyperlink to tagged content produces a list of items all having that tag in common. In addition, other content not considered resources per say may also be tagged with the same tag. Resource or content list 204 is expandable to display all of the line items. A user may select and invoke any item in the list to produce a list 205 of all other tags associated to that particular resource or content. The definition of resource is expanded here to include any content that could be tagged using the system of the invention. Therefore the term resource and content shall mean the same in this specification.

Tag summary 200 may include a ranking value 206 given the particular tag by the system of the invention as a result of a tag weighting application. In one embodiment tag weighting is performed by algorithm for each tag on a periodic basis. In a preferred embodiment tag weighting is based on tag usage statistics or "tag popularity". A tag may rise in popularity if more users rely on that tag to locate a particular resource over time. A tag may lose ranking when fewer or no users consistently use the tag to locate a particular resource. The algorithm may take into account the other tags applied to the resource so that for any one resource the most popular tags are known and the least relevant tags are also known.

In one embodiment a tag is rated accordingly across all of its resources and an average relevancy value may be assigned to the tag. For a single resource a tag pointing to that resource may be the most popular for that resource while for a next resource tagged with the same tag it may be the least popular in terms of tag relevancy for that resource. The method for determining if a tag is relevant depends on knowledge of tag history, for example, how many times the tag was used to discover information or content. This can be tracked per user across multiple resources or resource by resource. The value may be tag centric or resource centric where the tag has multiple values each pertaining to a specific resource in terms of relevancy.

Summary window 200 may provide information such as an indication if any other tags associated to a specific resource are ranked higher than the tag associated with the summary window. List 207 may contain higher-ranked tags for a same resource. In one embodiment of the present invention the system may suggest a tag for a resource that is being bookmarked and tagged by a user. It is important to note that a user may tag a resource without "personally" bookmarking the resource for local save. Tagging content does require the user identity, the tag, the content title and description summary, and current location information of the content on the network. The act of tagging then is essentially the act of bookmarking from the perspective of the system. However, a user may bookmark content to be managed centrally by the system without applying any tags to the content. The fact that the tagging process involves dissemination of at least the location information for the resource enables the system to determine immediately if there are tags already created for the content. If the content location information in the bookmark is new to the system and the user did not tag the content the system can tag the content using one or more descriptive words provided in the title or in the content summary description.

A concept described with reference to the Folksonomy-based enterprise system described in the cross reference section of this specification is that tags rise in popularity and become more relevant in searching for particular information when they are more widely adopted as preferred tags by users over time. In this system the central tag repository may be dedicated as a search indexing database returning linked results with interactive metadata to users who use the tags as search criteria in a search engine to discover information.

Lists such as user-created tags, and users who created a particular tag may be scrolled from within window 200 or may be independently searched in one embodiment. Tag summary window 200 may also include a search engine interface adapted to enable users to perform tag searches. A search interface 208 is provided to enable a user to search tags managed in the repository by name, user, value rating, or by bookmark entry. Inputting a tag name determines if the tag exists already in the repository. Inputting a user name returns all of the tags created by that user. Inputting a tag value or rating may return all tags rated at least with the same or higher value. Entering a bookmark URL or location parameter to a content known to a user may determine if it has already been tagged by any other users and therefore is discoverable through the system. All relevant information can be discovered relative to tags and associated tag attributes. Data correlation in the central tag repository (104) can be enabled by a correlation engine that fleshes out the different commonalities among the tags and metadata sets associated with the tags.

A search interface 209 is provided and adapted to enable a user to search for resources by tag, by user, by highest tag value, or simply by entering a bookmark URL or other network location information. The search interfaces just described are interfaces that can be made available through tag summary interface 200 and may be limited to information that has been correlated inside the central tag repository. Actual profile data, documents, Web pages, photos, and any other content need not be centrally stored within the information system. The tags managed within the system point to these resources wherever they are currently stored within the enterprise domain or somewhere else on a network such as the Internet network or another accessible sub-network.

It may be noted also that location information may be provided for certain tag attribute data such as user identification. For example, linking a user name (metadata) to an electronic user profile display, V-Card, or other profile forms may require location information if the profile is not centrally stored or internally resident in the system. It is not a requirement of the present invention to store any data other than tags and tag attribute metadata within the tag repository.

Each search interface includes a text input field for entering search terms and an interactive button for enabling a list view that may pop up as a separate window or as a scrollable list within the current window. Search categories may be provided and may be selected to restrict the search to certain information or content. Typical browser-based options may be included such as a back button, a history list of searches performed, and so on. In one embodiment of the invention the system is integrated through a framework to one or more third-party search engines such as desktop or portal-based enterprise Intranet search applications or Web-based public-access search engines.

The main purpose of summary window 200 is to enable a user to explore the various correlations that exist in the system relative to managed tags and tag attribute data such as enabling any user to see another user's created tags. Interactive window 200 serves as an effective and practical tool that opens one of a number of possible research paths a user may take in the process of information discovery. Other possible paths a user may embark on are enabled through connector framework and application program interfacing to third party applications. One with skill in the art of database content correlation will realize that search flexibility through interactive window 200 is limited only by the correlations that exist in the database. Any tag registered in the repository has at least one creator and points to at least one tagged content. The content tagged may have other tags registered in the repository so by content, multiple tags may be related and can be viewed in the light of a tagged content.

Figure 3:
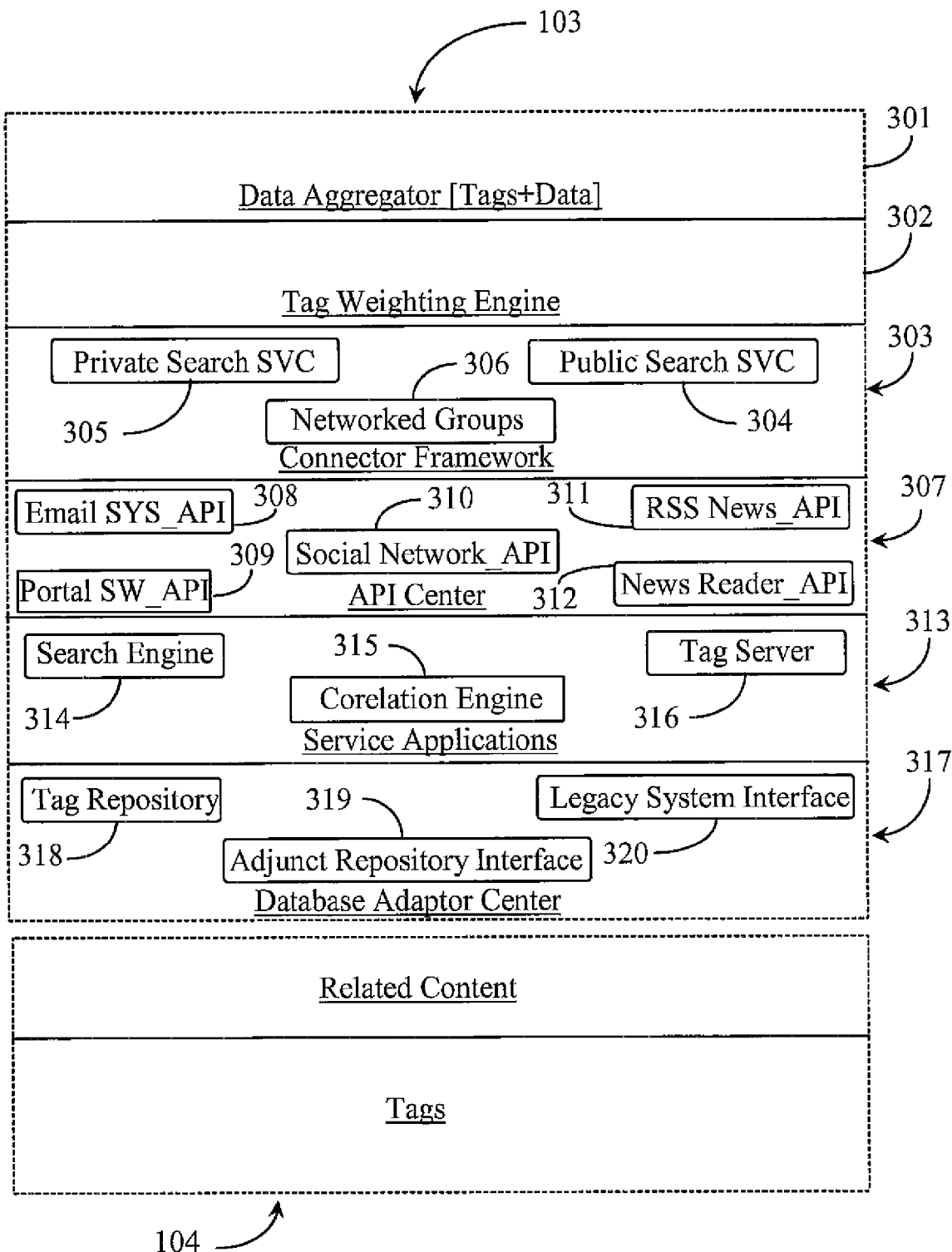
FIG. 3 is a block diagram illustrating basic layers and components of the tag management appliance of FIG. 1 according to an embodiment of the present invention.

FIG. 3 is a block diagram illustrating basic layers and components of the tag management appliance 103 of FIG. 1 according to an embodiment of the present invention. Appliance 103 includes a data aggregator 301 represented in FIG. 1 by SW 117 (TA). Data aggregator 301 is responsible for aggregating tags and associated metadata data for presentation to requesting users. Presentation may be realized by interactive display such as by a tag summary window like window 200 described above or some other interactive display. Aggregation of tags may be performed, for example, according to user input in the form of a search query, a structured database query, or as a result of some event trigger such as an interaction performed by a user using an integrated third-party application.

An example of tag aggregation is retrieving all of the tags created by personnel of a specific department of an enterprise for display and interaction. Tags may be aggregated according to one or more individuals. Filters may be provided so that users may put limitations on tag aggregating such as display tags created by the engineering department but only for bridge projects in progress. Users who create tags also have certain allowances for making their tagged and content public or private so content that may be discovered through a public interface using tags in the repository may be limited only to that content that is approved for public consumption.

Appliance 103 includes a tag weighting engine 302 represented in FIG. 1 by SW 117 (TW). Tag weighting engine 302 uses one or more algorithms and usage statistics data to rank or weight tags according to popularity among users who have created and continue to utilize those tags to discover resources. Tag weighting is an ongoing process as usage statistics evolve. A tag may become more relevant in terms of being the top tag for accessing a particular resource according to usage statistics of the tag. A tag may become less relevant if usage statics show that more users are relying on another tag to locate a particular resource. A tag may become less relevant but it is possible for the tag to experience a resurgence in popularity so tags are preferable not dropped or deleted from the repository based on relevancy. From the perspective of a single data set representing content or a resource, a particular tag pointing to one resource may be the most popular tag for that resource while the same tag is the least popular tag from a perspective of another resource that the same tag points to.

There are a variety of views that may be made available illustrating tag relevancy comparatively speaking. Multiple tags for a single resource can be aggregated and presented according to popularity from the most popular tag down for that resource. Tags in general can be ranked irrespective of the resources they point to by counting the frequency of use of each tag over a period of time. For example, a user may query the system to display the top 10 tags in the system.

Appliance 103 includes a connector framework defined as a set of programming code that enables deep integration of the platform of the appliance to other systems and third-party applications. Legacy database systems and other database information systems can be adapted to use the system of the invention to enhance information discovery services provided through those system interfaces to clients of those systems. For example, an information search engine may be adapted to present an offer to a user conducting a search using a search term that might exist in a tag repository such as tag repository 104 described further above. The user that input the term may be asked if he or she might desire enhanced results by allowing the engine to also access appliance 103 and tag repository 104.

Along with the standard search results listed in the search page, enhanced search results may be added in a separate section of the page or in a separate search page. An advantage of this integration possibility is that the tag history and correlated tag attributes are available to the user to further refine the search process. Connector framework 303 may be utilized to integrate the appliance for use with a public data search service (SVC) 304, a private data search service 305, or any structured or ad-hoc networked groups. A network of users may form a networked group and then acquire the services of the present invention for their own group monitored research. In this case, the users may tag content and may have their tags managed by service of the invention thereby creating record of who tagged what, when it was tagged, frequency of reuse of tags and so on.

In some cases a group of users utilizing the appliance and tag services of the invention might have already conducted much research into a subject of interest to a user such as computer programming, for example. The user which may not a member of or otherwise may not be subscribed to the system may be interested in the same subject matter. The user may without or before joining the network agree to allow results from using the tag word at the repository agreeing to run the tag used in a general search through the appliance data server. The results served from appliance 103 may contain richer options for interaction such as see users who created this tag and see what they have bookmarked. The interactive window or tag summary described further above may be made available to users who elect to include searching of the tag repository along with more general search tasks Appliance 103 includes an API center 307 that provides the APIs through connector framework 303 to adapt the system for access from specific third party network-based and desktop applications. The system of the invention can be integrated with a communications application like an email system through an email system API 308. System functionality may be accessed through a third-party portal server using a portal SW API 309. The system may be integrated to a social networking site using a social network API 310. Integration may also be made to really simple syndicate (RSS) news or other feeds through a RSS news API. Another application that the system can be integrated with is an interactive news reader using a news reader API 312. Other applications may be used to access the system of the invention such as collaboration and data sharing applications, sales and supply chain management applications and professional networking applications used to develop professional communities.

Appliance 103 includes a service application layer 317 that supports various service modules. A search engine 318 is provided and made accessible to users for the purpose of searching the tag repository by keyword or phrase. Search engine 314 may support the search engine interfaces described above with respect to the tag summary window 200 of FIG. 2. A data correlation engine 315 is provided within appliance 103 and is adapted to provide the correlation intelligence for enabling correlation of data sets and tuples within the repository.

Appliance 103 includes a database adaptor center 317 that provides support for various adapters such as an adapter to a tag repository such as repository 104 illustrated in this example and in FIG. 1. An adjunct repository interface 319 may be provided for adapting the system for access by another data repository, a legacy system interface may also be provided to adapted the system to be accessed through a legacy database application. Repository 104 contains tags and related content termed tag attribute data elsewhere in this specification. Actual tagged content may be stored in repository 104 is some embodiments but it is not required in order to practice the present invention. In one embodiment only location information and metadata is provided relative to tagged subject matter including resources and personal profile and contact information.

Tags are not repeated anywhere in repository 104. Each time a tag enters the system where the tag already exists in the system new tag attribute data may be entered into the repository to compliment or update tag attributes already resident in the repository and associated with the tag. New tag attribute data may include a new content description and location information (new tagged resource) and the name and profile information including contact information for the user that created the tag instance if the user is a new user. If the user submitting the tag is known to the system and the tag already exists in the system, the user may be credited for creating the tag and may be associated with other users that have created the tag. If the tag is new to the user, the tag may be added to other tags known to be created by the user or the user's tags. If a user has more than one role known to the system, there may be more than one profile, tag set, and contact data stored for the user.

Tags may be organized, stored and aggregated for individuals or defined groups. A group may be a social group, a business group or a blending of the two. All personnel of an enterprise may be defined as a group where there are several groups or departments within the group. Therefore, tag aggregation may follow some hierarchy in a correlation scheme.

Figure 4:
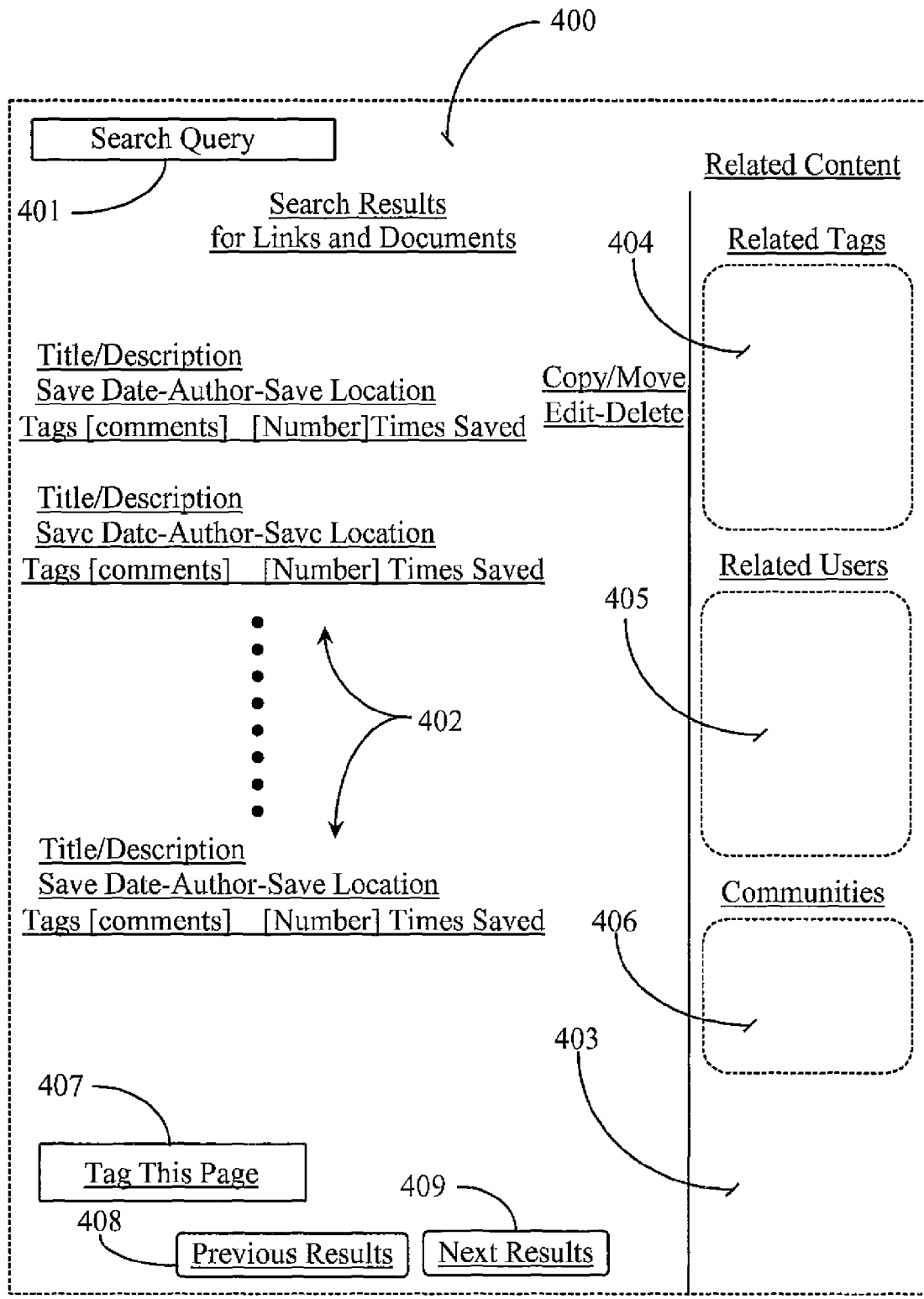
FIG. 4 is a generalized view of an interactive search result page integrated with tag management utilities of the present invention.

FIG. 4 is a generalized view of an interactive search result page 400 integrated with tag management utilities of the present invention. Result page 400 is adapted according to aspects of the present invention to display search results for an information search conducted within the scope of links and documents created and saved relative to a user's social/business network. The exact scope of such an information search is widely flexible and is not limited to links and documents bookmarked by associates or co-workers of the user. Search result page 400 may be adapted to display results for people search, image search, news search, whitepapers, knowledgebase, multimedia presentations, or any other category of content. Moreover, search result page 400 may be displayed as a result of a private search of local Intranet content or it may contain results of a public search performed using a public search interface where the search interface is integrated by framework to the system of the invention and therefore results returned may be enhanced according to aspects of the invention.

In one embodiment of the present invention, a third-party search engine application may be adapted to solicit search engine users conducting typical data searches if they would like to see results provided by the host of the system of the invention along with, in addition to, or in place of the normal search results. If a user accepts, the search query is used at the tag repository system and the recognized tags in the query are used to produce the results. A user may also be prompted if they would like to join a community enhanced with the service of the invention or perhaps subscribe to the service in general for specialized search capabilities and enhancements provided by the system.

A user conducting the information search enters a search term or phrase into search query input field 401. Result 402 may be displayed in list form and may be displayed according to relevancy as is the case with typical filtered search engine results. In this example a result 402 includes the title of the result and a short summary description. Result 402 also includes the date that the content was bookmarked and tagged. It is noted herein that in one case tagging is all that is required of a user to "virtually" bookmark the location of content. It is not required of a user to bookmark the content as a "favorite" stored locally to the user. The system may maintain the bookmark or bookmarklet on behalf of the user. If the user is a subscriber to the system tagging the content includes provision by default of the user name and other attributes that are later available to any user in a search result page such as page 400.

A search result also includes the author or name of the user who saved the link. The URL or content location is included as well so that the user interacting with the results may navigate to the content. Each search result 402 includes a tag summary link that when invoked displays all of the tags for that content. Each tag displayed may be independently invoked to display the users who created the tags, the dates those tags were created, the ranking values of those tags, and other tag attributes. In one embodiment, a link to user comments made about the content of a search result is displayed and can be invoked to browse comments made by users. Each comment may contain embedded links to user profiles including contact data. A display of comments may also include an interface enabling the instant user to submit a comment. In one embodiment a search result also contains a current indication of the number of times the content has been saved or tagged by users.

Search result page 400 is further enhanced by a sidebar area 403 that independently displays content related to any search result a user highlights or selects via computerized input. In the sidebar area 403, a placeholder 404 is provided to display all of tags related to the tag that the user submitted to bring up the result. This list may be that same list that can be invoked by selecting the link "Tags" in the search result summary. Sidebar area 403 includes a placeholder for displaying a list of users related to a search result, that is, who tagged the content pointed to by the result. Sidebar 403 also includes a placeholder that is adapted to find and display any communities that may exist that are topically related to the content pointed to by a search result.

Further interaction may be had by invoking hyperlinks embedded in the information displayed in placeholders 404-406. Additional pages, information bars or windows, pop-ups and the like may be caused to display for users interacting with information provided. For example, clicking on a user listed in placeholder 405 may cause a display showing the user profile, contact information, user tags, and communities that the user belongs to. Invoking a listed community may launch a registration page for the community or the community interface enabling participation if registration is not required. Invoking a related tag listed in placeholder 404 may bring up a tag summary window showing tag history, ranking, user information, etc. It will be clear to one skilled in the art of interactive displays that other placeholders may be provided that may be adapted to display other information related to a search result.

Search result page 400 includes typical navigation buttons for viewing next results (409) or previous results (408). In one embodiment an interactive button 407 is provided on the search result page that enables a user to tag the page. Tagging a search result page may be tantamount to tagging each of the results listed on the page. In one embodiment, the page is added as a bookmarked resource but the tag is not created for each of the separate search results listed on the page. It is also noted herein that the process of tagging content may be time sensitive. The tagged content and the created tag and attributes may be given a specific time to live (TTL) in the system and may be dropped after the TTL expiration point occurs. This may be useful in collaboration to enable users to find content for which access and utilization is only required for the period of a project or planned event and is not expected to be required again.

Figure 5:
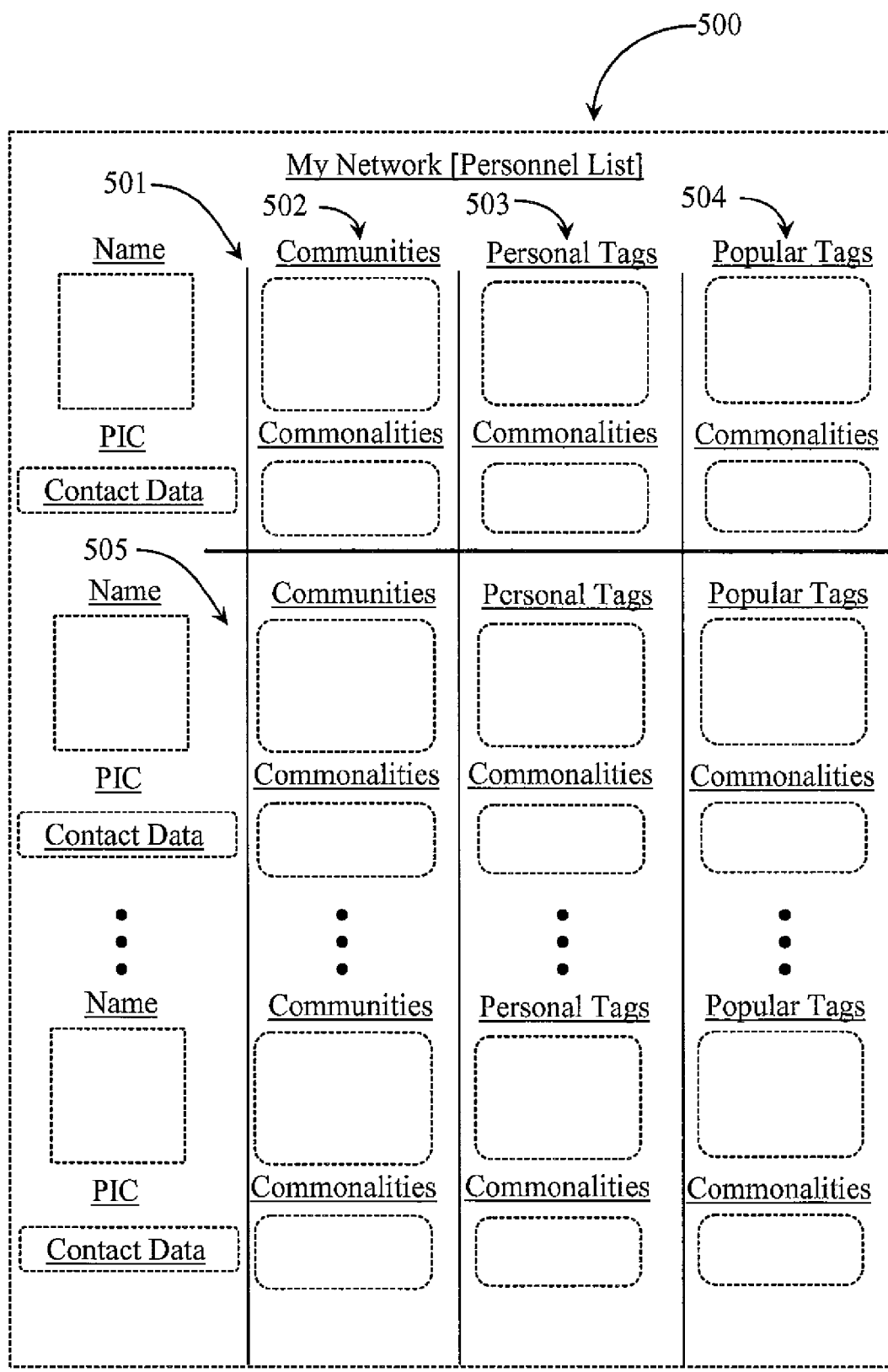
FIG. 5 is a generalized view of an interactive personnel list of contact profiles enhanced with data discovered through tag management according to an embodiment of the present invention.

FIG. 5 is a generalized view of an interactive personnel list of contact profiles enhanced with data discovered through tag management according to an embodiment of the present invention. An interactive window 500 may be caused to display by a user interacting with the system of the invention through a browser-based interface. Window 500 may be invoked as a result of a user ordering a view of personnel included within the domain or domains of communities or other groups that the user is involved with. A user my tag and bookmark users as he or she practices the present invention during information searching. The tagged users may be added to a user's contact list, buddy list, or any other electronic list the user maintains or that the system of the invention maintains on behalf of the user.

In one embodiment, a user may select a creator of a tag known to belong to a community and do a quick search (correlation) of related users of the same community. The users may be related by a commonality such as by having one or more tags in common with one another. The list of users may also be a complete list of all of the members of one or more communities. In this example the displayed results are presented in vertical list having four columns with column headings.

Reading from left to right, a first column 501 is adapted to display the names and pictures of users. Each name and picture is associated to an interactive button that may be invoked to call up the contact data available on a user. A next column 502 is adapted to display all of the communities that a user may be associated to and which of the listed communities the user also is associated to (commonalities).

A next column 503 is adapted to display tall of the personal tags of a user and which if any of those tags is also a user tag (commonalities). A next column 504 is provided and adapted to display the popular tags of a user and which of those popular tags is also shared by the user. A user operating through interfacing window 500 may invoke contact data for any listed user and may interactively browse the rest of the Some of the data that would normally be accessible to users engaged browsing profiles of other users may be unavailable or locked for security or other reasons. A user may apply a filter or mask for filtering or masking the results. List 500 may be a list of profiles found by the user due to interaction with a user result listed in a search results presented in a search result page such as page 400 or perhaps via interaction with a user listed in a tag summary interface.

The list of users may represent those users of a community that the instant user performing the research has just found. The user may automatically see which of the users have some relation or commonality to the instant user. The user may or may not join the community, or he or she may already be a member of the community. Likewise, the user list may contain user profiles that are not related to one another and the instant user may be browsing the list to determine if any of these users might be invited into a community the instant user is involved with. There are many possibilities.

Figure 6:
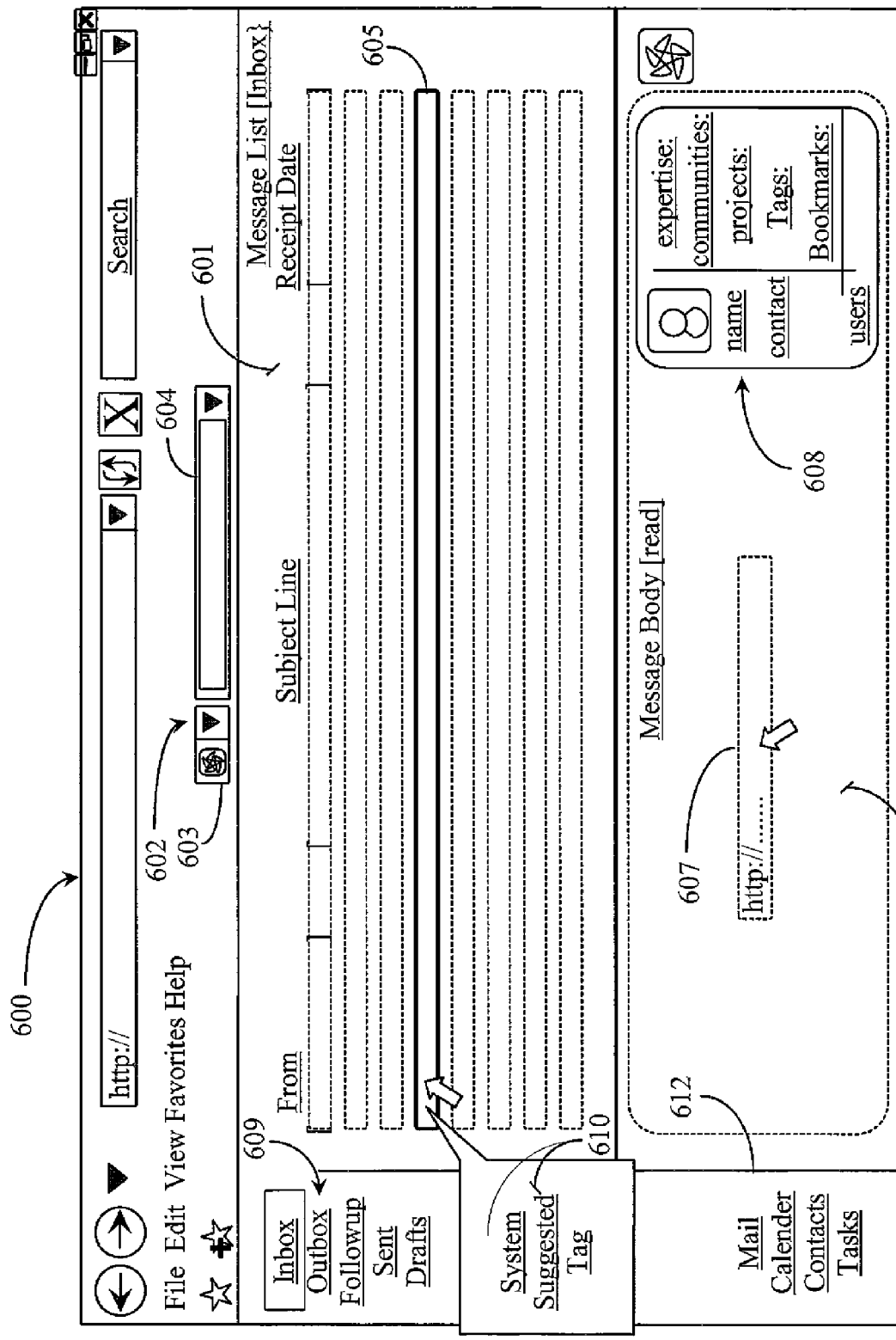
FIG. 6 is a generalized view of an interactive email application interface integrated with the tag management system of the invention.

FIG. 6 is a generalized view of an interactive email application interface 600 integrated with the tag management system of the invention. Interface 600 is that of a desktop email application however the invention may also be practiced through an Internet message access protocol (IMAP) email interface. Typical implements of a desktop email application include a side bar showing at least the folder types 609 created for mail and interactive options 612 including mail, calendar, contacts, and tasks. According to one aspect of the present invention, users who subscribe to services made available by the system of the invention may be represented visibly to other subscribers in messages sent over the network through desktop and Web-based messaging systems.

Interface 600 includes a message inbox display 601 containing multiple messages received to the mail inbox of a user. In this case the user subscribed to the service of the invention and has a toolbar 602 added to interface 600 similar to the browser toolbar described further above. Toolbar 602 includes an executable icon 603 that when executed invokes a bookmarking application for tagging content. Toolbar 602 also includes a search interface for performing a quick information search of the system repository including searching links and documents, people, and communities.

Message inbox display 601 is split to include the option for reading a message in the lower half of the window. In this example a message 605 is highlighted and displayed in open form as a message body in window 611, a typical option for desktop email interfaces. Also typical, each message listed in window 601 indicates who the message is from a subject line of the message and the date the message was received into the inbox.

In this example message 605 is from a person who is also a subscriber to the services of the present invention. This may be indicated by a graphic icon representing a logo or mark of the service as illustrated here in window 605 next to a pop-up profile summary window 608. In one embodiment, incoming mail can be filtered to separate email from system users from the rest of the mail. In one embodiment the identifying icon or logo indicating that a message is from a system user can be displayed in the subject line of message 605 before it is selected. The inbox folder icon in folders 609 to the left of window 601 may also indicate by some graphic representation that there is one or more messages in the inbox from a user of the system of the invention.

Message 605 is expanded in window pane 611 and includes pop-up profile summary 608. Profile 608 is interactive in nature and includes a picture and name of the user, and a contact information link to contact information for the user. Other attributes of the user profile are also represented by interactive links including a link to a descriptive presentation of the expertise of the user, a link to a list of communities for that user, a link to projects the user is and/or has been involved with, a link to tags created by the user, and a link to bookmarks of the user. Also listed at the bottom of the popup window are links to subscribers (users) who also received email message 605. A user invoking any of the described links may further the process of information discovery relative to that user or related users. Clicking on a user may replace the current popup window 608 with a popup window containing links to the information about that user.

In one aspect of the invention there are varying degrees of interaction users may have with the system of the invention. For example, the users profile summaries may not be proprietary to just one system or company. A user may use a social networking profile or a V-card in place of an interactive system profile. For example, window 608 may appear but a link to a profile from a social network or some other system may appear instead. Such a user may still be enabled to participate in bookmarking, content tagging and communities.

A user may tag any of the messages residing in any of the folders in the email interface. In this case message 605 contains an embedded hyperlink 607 to some content. The user may highlight the embedded link and then invoke the bookmarklet executable 603 to launch an interactive dialog box for saving the link to the service and, perhaps tagging the link as well. In this process the system may suggest a tag 610 such as an email domain from the email account the message originated from. The user may ignore the suggestion and create a tag. The user is not required to tag the content in order to bookmark the content. Moreover, the user is not required to bookmark the content in order to tag the content. The system can bookmark the content from information provided during tagging of the content. In this case the bookmark is stored at the system and becomes a system bookmark rather than a personal user bookmark. There are many flexible variations that can be practiced.

In one application a user may highlight the displayed content and then click on the bookmarklet option bringing up a dialog box with fields to fill in. Minimally, the system needs to know the location of the content, the title of the content. A bookmarklet [saved content] may be required to have at least one tag before it can be indexed for search using the tag. In one embodiment a user may allow the system to automatically tag the content saved. There may be an option provided to the user to elect a share level from more than one level allowed for the content saved. A user may elect to share with all other users or to keep the content private. A user may also elect to share only with a specific group of users or a community. In the event of private content, a tag used to relate to the content may also be private and not visible as a user tag to other users.

In one embodiment of the present invention the search interface for searching the tag repository for related content may be integrated to collaboration applications such as Microsoft SharePoint™.

Figure 7:
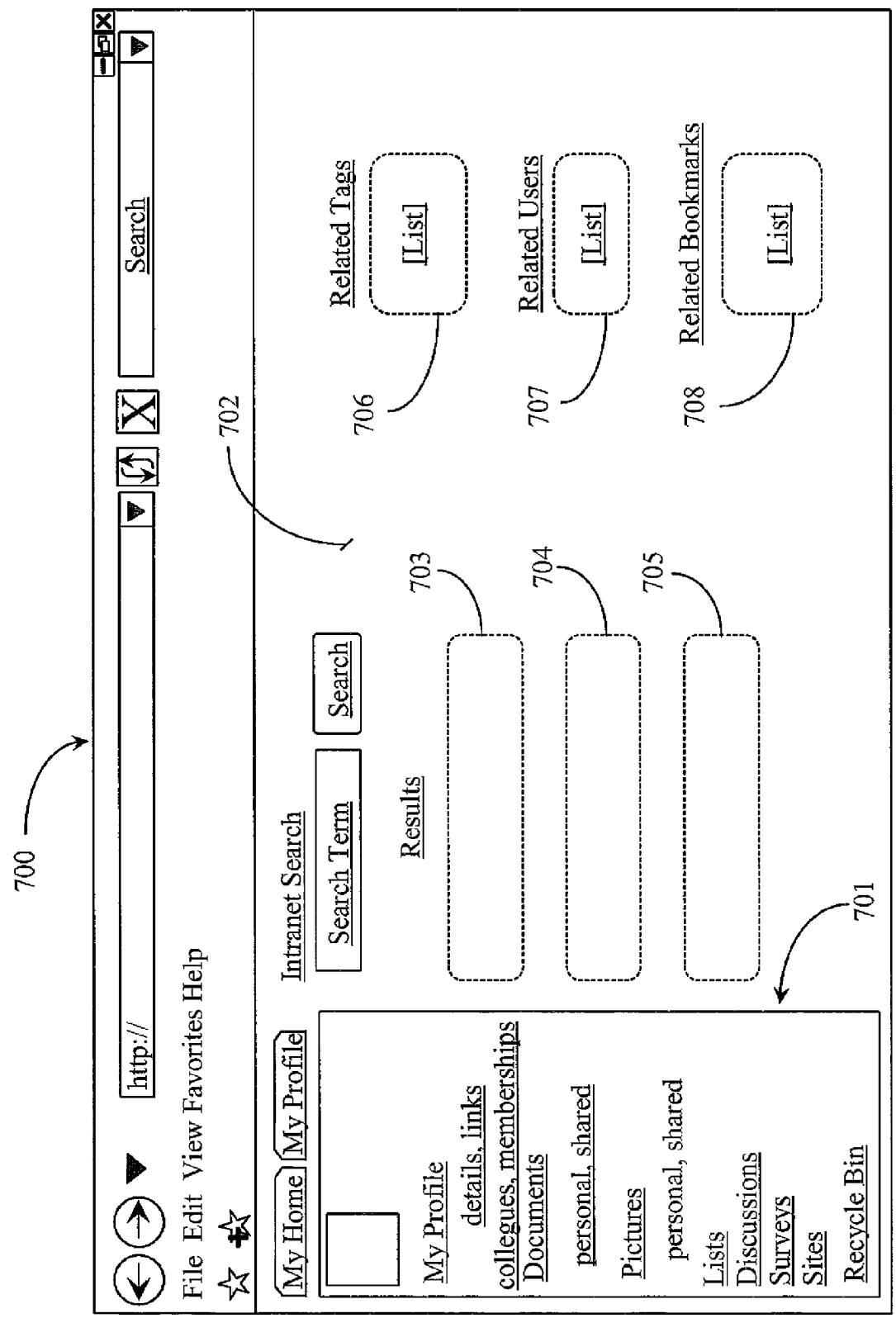
FIG. 7 is a generalized view of a search result page nested into a browser window according to an embodiment of the present invention.

FIG. 7 is a generalized view of a search result page 702 nested into a browser window 700 according to an embodiment of the present invention. In this example a search interface is integrated through API into a collaborative application that may be an enterprise 2.0 application like Microsoft SharePoint™ or some other. Search result page 702 illustrates the same format previously described above but it is nested in the interactive interface and includes sidebar 701 detailing information about the user of the interface.

Sidebar 701 includes the selectable display options of My Home and My Profile. Information available by links displayed within the sidebar include the user's profile including summary view, detailed view, and links. A list of colleagues, a list of memberships, and a list of documents authored by the user are also part of the profile information. The information view options personal and shared are provided so the user can split or segregate the information on demand between personal details, links, colleagues, memberships, and documents and those that the user has elected to share with others. The profile may include personal and shared pictures. The information may include lists, discussions, surveys, and sites both personal and shared.

The search result page includes results 703, 704 and 705. Selecting any one of the displayed results may cause the display of related tags 706, related users 707, and related bookmarks. The use of a robust tag repository as a network search index provides users not only with a way to network with other users but also with rich tools to discover information as well through the same interface. As more users interact with the system more tags enter the system and are classified and weighted with each individual tag providing a wealth of information. Data mining the tag repository can produce rich usage statistics and history enabling system knowledge workers to fine tune the system and develop more services for users.

Figure 8:
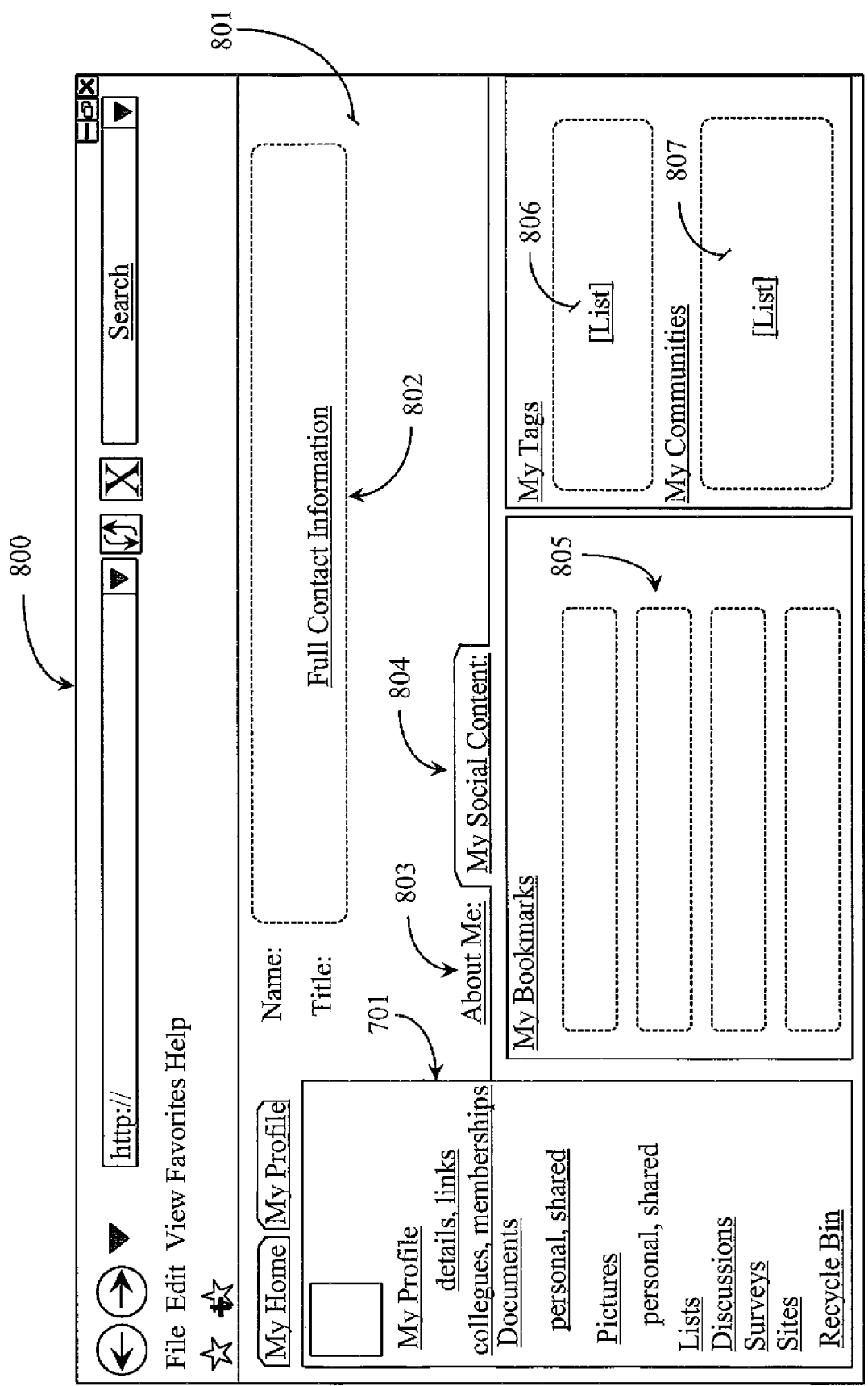
FIG. 8 is a generalized view of a detailed profile page enhanced with information discovered through tag management.

FIG. 8 is a generalized view of a detailed profile page 801 enhanced with information discovered through tag management. Profile page 801 is nested in the same collaborative application of FIG. 7. Browser interface 800 displays the profile information page 801 as a result of selection of My Profile and details in the sidebar (701) for example.

Profile page 801 includes a full contact information display 802. Selectable options About Me 803 and My Social Content 804 are provided. Selecting about me may cause display of detailed information the user wishes to provide such as a personal blog, a resume, self describing tags [user created] and so on. Likes, dislikes, personality surveys, music tastes, recreation photos, sports photos, and other personal information may be disclosed. In this example bookmarks 805 of the user are displayed as well as a list 806 of all of the user's tags and a list 807 of all of the user's communities. A user may ultimately decide which content will be shared or kept private at the time that content is added into the user's profile. An interface may also be provided for the user to manage content enabling the user to publish formerly private content and to make private formerly shared content.

Various filters may also be created by the user for presenting custom views of information for certain groups, individuals or communities. In this way a user who is also a professional may show a preferred "face" to other professional groups. Some users may have more than one role and therefore may configure profile information accordingly to perpetuate those roles appropriately in professional and in private life. One unique advantage of the tag repository system of the invention is that only tags and associated metadata need be stored and maintained in the repository. Actual content may be stored anywhere that is accessible to the primary network the system connects to and is accessible through.

Uses for the system of the invention vary according to needs of clients. Third-party search engine clients may use the system to provide enhanced results by proxy to their clients. Other information systems may use the tagging and tag classification processes to enhance their own information search capabilities. While typical search terms indexed for data search are by themselves rather benign, the correlated tags of the present invention are executable files that may be distributed in executable form to all kinds of electronic information interfaces where users may select and immediately begin their own information discovery process.

In one aspect of the present invention where tagged content locations are transitory or mobile and not always connected to the primary network, conventions may be provided to automatically change and update location information in real time through the use of directory servers, domain name servers, and other real-time registration servers. For example, tagged content may reside in a shared folder on a personal computing appliance that is configured for wireless networking in one or more secured or unsecured wireless networks. The system may be enhanced to search for computers in a Wi-Fi network that has access to the Internet network whereby once the computer is found "online" the user may be prompted with the network authentication dialog box to join the network and complete the connection path to the shared folder holding the tagged content. Presence information, if available may also be discovered to determine if content sources are "online" or "off line".

In another embodiment a user having tagged content stored on a PC may enable access to the PC through the Internet to other users that wish to access the tagged content. The user can set up a remote access application like "Go to My PC™" so that the content may be accessed by a remote computer and the system may prompt users who clicked on a link to access the specific content to download and install a remote PC access software or to activate such a program that may already be provided on the user's system and attempt invocation of the link again. If the content is made available to all then no password may be required to access the content. If the content is secured by password then those authorized to access the content would be given the password ahead of time. In one embodiment, the user may submit a password to the system when the content is tagged. The password may be automatically provided by the system to authorized users who invoked the tag and selected the tagged content for display.

In one embodiment, the system monitors link failures or dead links and when that occurs, the system may attempt to access the content on its own to verify the failure. The system may attempt to re-locate the content using a variety of methods depending upon the network architecture and actual location of the content and if successful may repair the navigation path to the content.

The system of the invention may be practiced on public or private network segments including incorporation of ad-hoc wireless groups as long as an Internet gateway exists to the ad-hoc network. The system may be used in docketing systems and in virtual private network accessible data and information systems.

It will be apparent to one with skill in the art that the tag repository and tag management system of the invention may be provided using some or all of the mentioned features and components without departing from the spirit and scope of the present invention. It will also be apparent to the skilled artisan that the embodiments described above are exemplary of inventions that may have far greater scope than any of the singular descriptions. There may be many alterations made in the descriptions without departing from the spirit and scope of the present invention.

What is claimed is:

1. A tag system comprising:

An Internet-connected tag-storage and management computerized unit comprising at least one data repository, a server coupled to the at least one data repository, and one or more processors connected to the server and having access to the at least one data repository, the processor or processors executing first coded instructions from a non-transitory physical medium, the coded instruction providing functions including serving tags associated with tag attribute data to member users through the Internet network and receiving tags and tag attribute data from member users, and storing the received tags and tag attribute data in the at least one data repository;

a plurality of interest-connected appliances enhanced with second coded instructions presenting a toolbar integrated with a browser application, the toolbar enabling member users to interact with the Internet-connected tag-storage and management computerized unit and the first coded instructions; and an email application enabled to determine if an email listed or displayed for a first member user is from or to another member user, and if so, to provide a visual alert to the first member, and to provide interactive indicia in the email display initiating functionality of the tag system;

wherein a member user is enabled through the second coded instructions interacting with the Internet-connected tag-storage and management computerized unit and the first coded instructions to tag any stored content accessible by the member user of the computerized appliance, the stored content stored in any accessible location, and information regarding the content tagged in each instance is associated with the tag as tag attribute data, the tag attribute data including at least an identity of the user tagging the content, a URL if the content tagged is a web page, a URL and a further location if the content is a portion of a web page or a document on a web page, further location information if the content is stored on a data storage unit at an Internet-connected appliance other than on a web page, wherein the user is enabled through the second coded instructions interacting with the Internet-connected tag-storage and management computerized unit and the first coded instructions to search for content for which tags are stored in the at least one data repository of the Internet-connected tag-storage and management computerized unit, to retrieve tags found in such a search, including tag attribute data associated with the retrieved tags, and to navigate to and access the tagged content through the associated with the retrieved tags, and to navigate to and access the tagged content through the associated tag attribute data, and wherein the user is enabled to access an interactive tag summary window for any specific tag, the tag summary window providing at least identity of others who have created or used the specific tag, a summary of different content associated with the specific tag, a summary of other tags associated with any content also associated with the specific tag, and a tag ranking value for the specific tag, the ranking value determined at least in part by number of users associated with the specific tag and number and frequency of use of the specific tag.

* * * * *